US005487123A

United States Patent [19]
Fowble

[11] Patent Number: 5,487,123
[45] Date of Patent: Jan. 23, 1996

[54] CONNECTORS FOR OPTICAL FIBERS INCLUDING RESILIENT/EXPANDABLE MEMBERS

[75] Inventor: Juliana V. Fowble, Ithica, N.Y.

[73] Assignee: Delco Electronics Corporation, Kokomo, Ind.

[21] Appl. No.: 332,303

[22] Filed: Oct. 31, 1994

[51] Int. Cl.⁶ ............................................ G02B 6/38
[52] U.S. Cl. ................... 385/70; 385/53; 385/55; 385/56; 385/60; 385/62; 385/66; 385/72; 385/77; 385/78; 385/84; 385/139; 385/137
[58] Field of Search ........................ 385/53, 54, 55, 385/56, 60, 66, 69, 70, 71, 72, 75, 76, 77, 78, 84, 62, 81, 136, 137, 139

[56] References Cited

U.S. PATENT DOCUMENTS

| | | | |
|---|---|---|---|
| 4,140,365 | 2/1979 | Burger et al. | 385/72 X |
| 4,146,299 | 3/1979 | Wellington et al. | 385/98 X |
| 4,240,695 | 12/1980 | Evans | 385/70 X |
| 4,432,602 | 2/1984 | Margolin | 385/137 X |
| 4,741,590 | 5/1988 | Caron | 385/72 X |
| 4,805,980 | 2/1989 | Mackenroth | 385/72 X |
| 5,076,656 | 12/1991 | Briggs et al. | 385/71 |
| 5,119,455 | 6/1992 | Jennings et al. | 385/71 X |
| 5,274,729 | 12/1993 | King et al. | 385/134 |
| 5,317,663 | 5/1994 | Beard et al. | 385/70 |
| 5,333,222 | 7/1994 | Belenkly et al. | 385/70 |
| 5,367,595 | 11/1994 | Jennings et al. | 385/71 |

*Primary Examiner*—Brian Healy
*Attorney, Agent, or Firm*—Jimmy L. Funke

[57] ABSTRACT

A connector is provided for securing one or more optical fibers to a mounting member, such as an instrument panel module wall or a light pipe within an instrument panel. The connector generally includes a body characterized by a longitudinal axis, a first end, an oppositely disposed second end, and an internal passage formed within the body along the longitudinal axis. The internal passage is tapered so as to have a smaller cross-section at the second end than at the first end, with the internal passage at the first end being sized to receive the one or more optical fibers. Expandable members are formed at the second end of the body, which enable the internal passage at the second end to radially expand and accommodate the optical fibers. In doing so, the expandable members serve to grip the optical fibers when disposed within the internal passage. At least one pair of resilient members extend from the midportion of the body, and both extend towards either the first or second end of the body. The resilient members are configured to engage and secure the connector to a corresponding feature formed in the mounting member using a simple push-in action.

20 Claims, 2 Drawing Sheets

CONNECTORS FOR OPTICAL FIBERS INCLUDING RESILIENT/EXPANDABLE MEMBERS

The present invention generally relates to connectors for optical fibers. More particularly, this invention relates to connectors for optical fibers used to transmit a light beam from a light source for the purpose of backlighting an instrument panel, in which the connectors are characterized by optical efficiency, ease of assembly and disassembly, and a cost efficient, readily manufacturable, single piece configuration.

BACKGROUND OF THE INVENTION

Fiber optic technology has found numerous uses in signal and light transmission applications. In the automotive industry, fiber optic technology has been proposed for use in sensing devices in which light is transmitted and subsequently detected, with a change in the light signal serving to indicate a change in the status of a vehicle system. Fiber optic technology has also been investigated for use in vehicle lighting systems, such as the backlighting of an instrument panel in the passenger compartment. In such an application, there are several advantages to using fiber optics in place of conventional lighting sources. These advantages include reduced power consumption, high light output intensity for a given amount of space within the instrument panel, the ability to light remote areas with a single light source, reduced heating of the instrument panel because the light source is remotely located and because optical fibers do not transmit any significant amount of heat, lighting uniformity, lower installation, replacement and repair costs because the light source can be accessibly located remote from its intended target, and higher efficiency resulting in the requirement for fewer light sources for a given application.

To facilitate assembly, instrument panel clusters are often manufactured as modules which assemble as units onto a vehicle. Therefore, an optical fiber which is to deliver light to a particular button or cluster can be configured as an integral part of the module, and the light source of the system can be installed as a separate unit remote from the module. In order to successfully implement fiber optic technology for backlighting an instrument panel, it is necessary to ensure that the individual optical fibers within a module are properly aligned with an incoming fiber bundle from the light source. Furthermore, the individual optical fibers must also be properly aligned with their intended target, such as a light pipe which extends behind a cluster of buttons to be backlit.

While other techniques are foreseeable, one solution is to employ mechanical connectors which are specifically designed to align one or more optical fibers relative to another optical fiber, an incoming fiber bundle or a light pipe. To be suitable for use in the automotive industry, such a connector should preferably enable an optical fiber and/or bundle to be readily assembled and disassembled, yet be capable of reliably securing the optical fiber or bundle even when subjected to vehicle vibration and temperature variations. In addition, the connector should preferably have a relatively uncomplicated design and be relatively inexpensive to manufacture. Due to the current status of fiber optic technology as used to backlight an instrument panel of an automobile, connectors which are able to satisfactorily achieve each of the above requirements are generally not available or suffer from one or more deficiencies.

Accordingly, what is needed is a mechanical connector which is configured to achieve each of the above requirements and characteristics, so as to be suitable for use in a fiber optic backlighting system for an automobile.

SUMMARY OF THE INVENTION

It is an object of this invention to provide a mechanical connector for use in an automotive fiber optic system for securing and aligning optical fibers relative to each other.

It is a further object of this invention that such a mechanical connector be readily assembled with one or more optical fibers and installed within an instrument panel backlighting system of an automobile.

It is another object of this invention that such a mechanical connector be capable of reliably securing one or more optical fibers so as to resist vibration, yet readily permit disassembly of the fibers for purposes of servicing, repair and replacement.

It is another object of this invention that such a mechanical connector be readily manufacturable and have a relatively uncomplicated design.

In accordance with a preferred embodiment of this invention, these and other objects and advantages are accomplished as follows.

According to the present invention, there is provided a connector for securing an optical member, such as one or more individual optical fibers, to a mounting member, such as an instrument panel module wall or circuit board, so as to align the optical member with another optical member. The connector generally includes a body characterized by a longitudinal axis, with a first end and an oppositely disposed second end of the body being located on the longitudinal axis. An internal passage is formed within the body along the longitudinal axis. The internal passage is tapered so as to have a smaller cross-section at the second end than at the first end, with the internal passage at the first end being sized to receive the optical member.

Formed at the second end of the body are expandable members which enable the internal passage at the second end to radially expand and accommodate the optical member. In doing so, the expandable members serve to grip the optical member when disposed within the internal passage. Finally, a pair of resilient members extend from the body. Each of the resilient members has a substantially longitudinal portion which extends towards either the first or second end of the body. Formed on the longitudinal portion of each resilient member is a feature for engaging and securing the resilient member to a corresponding feature formed in the mounting member, such that the connector can be interlocked with a suitable mounting member using a simple push-in action.

The connector as generally described above is particularly suitable for aligning an individual optical fiber to a light pipe of an automotive instrument panel. In such an embodiment, the longitudinal portions of the resilient members extend toward the second end of the body. As such, the connector is adapted to interlock with a mounting member, such as a circuit board on which the light pipe is mounted, with the expandable members at the second end of the connector gripping the optical fiber in such a manner that the fiber is reliably aligned with and abuts the light pipe in order to maximize the optical efficiency of the junction.

Another connector embodiment in accordance with this invention generally incorporates the physical features discussed above, but with certain modifications so as to make the connector particularly suitable for aligning one or more individual optical fibers of an instrument panel module with a fiber bundle from the vehicle. For this purpose, the connector includes a first pair of resilient members for securing the connector to an incoming fiber bundle, and a second pair of resilient members to secure the connector to the module wall so as to align the fiber bundle with the one or more individual optical fibers of the module. As with the resilient members of the previous embodiment, the second pair of resilient members also have longitudinal portions, but extend in a direction opposite to the first pair of resilient members and towards the second end of the body.

With either connector configuration, one or more optical fibers are inserted into the internal passage from the first end of the connector. As the end of the optical fiber advances towards the second end of the connector, the expandable members resiliently expand sufficiently to accommodate the optical fiber, while simultaneously generating a gripping force on the fiber. Preferably, the gripping force is sufficient to reliably secure the optical fiber in the internal passage, yet allow for adjustments if necessary during installation to appropriately align the optical fiber to the optical element (e.g., a second optical fiber or a light pipe) to which the fiber is to be coupled.

As described above, a mechanical connector configured in accordance with this invention is capable of being readily assembled with one or more optical fibers, and thereafter secured to a mounting member in a manner which reliably secures and aligns the optical fiber with a corresponding optical member. As such, the connector enables an optically efficient fiber optic backlighting system to be readily installed in mass production. Furthermore, the connector enables its optical fiber to be readily assembled to its corresponding mounting member, yet also permits disassembly for servicing and replacement.

In addition to the functional advantages of the connector of this invention, the connector is characterized by a relatively uncomplicated one-piece design, so as to be relatively inexpensive to manufacture. Other advantages include cost savings to the automobile manufacturer, in that the connector is designed to be compatible with modular instrument panel clusters. Therefore, the connector is completely compatible with manufacturing and installation methods which minimize assembly time and costs.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
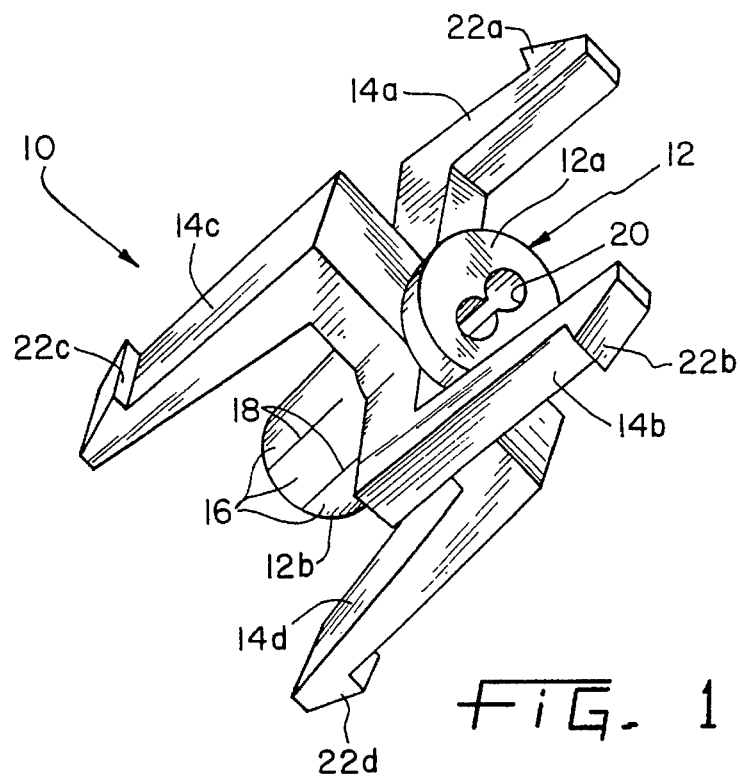
FIG. 1 is a perspective view of a mechanical connector which is configured to interconnect a vehicle fiber bundle with a backlit instrument panel module, in accordance with a first embodiment of this invention.
Figure 2:
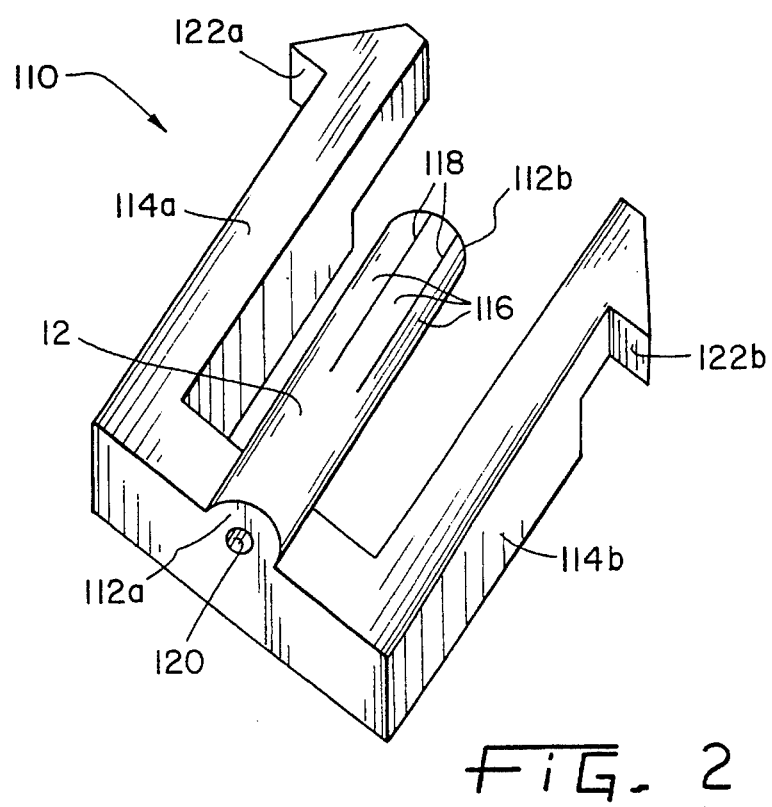
FIG. 2 is a perspective view of a mechanical connector which is configured to interconnect an individual optical fiber with a light pipe within an instrument panel module, in accordance with a second embodiment of this invention.
Figure 3:
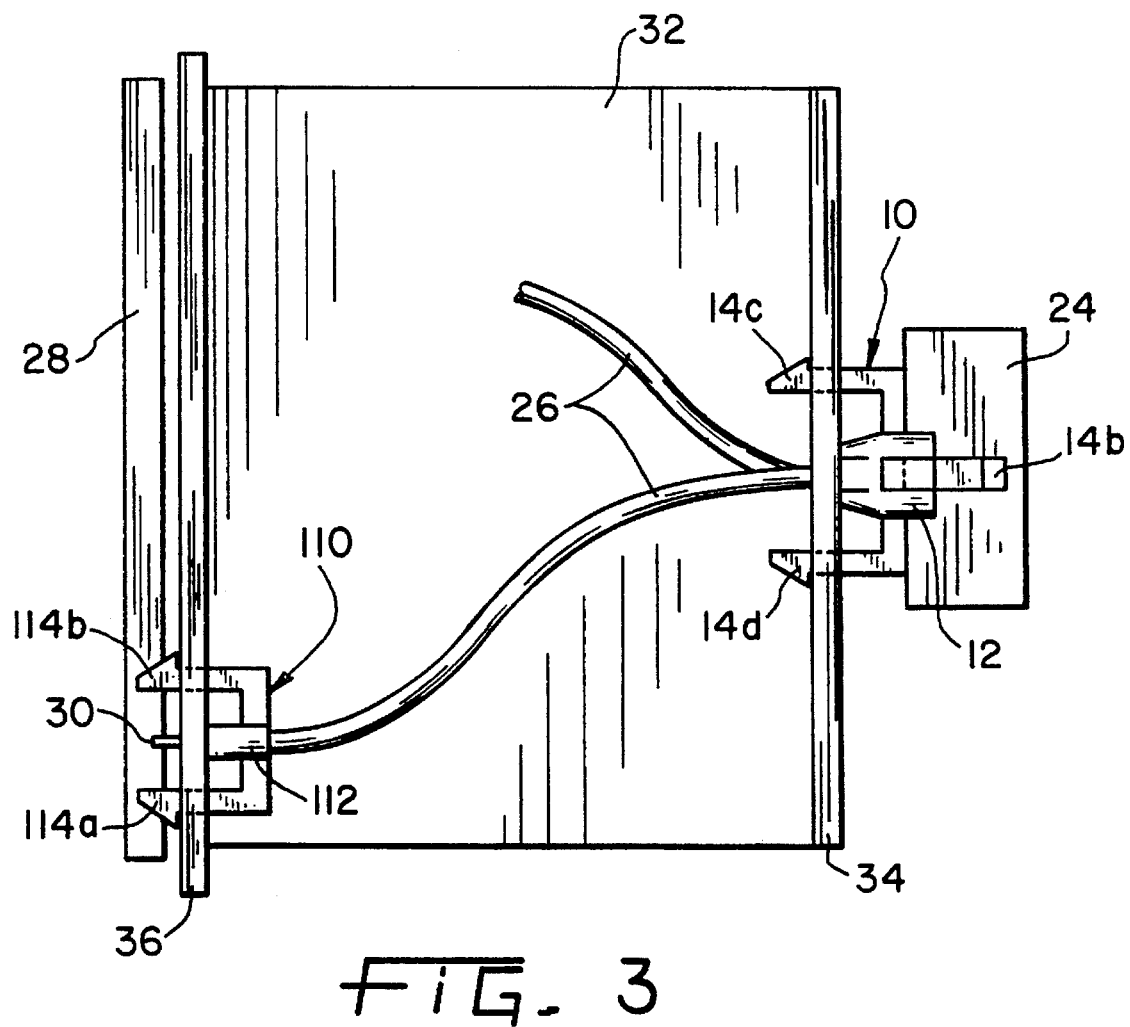
FIG. 3 is a cross sectional view of a backlit instrument panel module in which optical members are secured and aligned to and within the module by the mechanical connectors of FIGS. 1 and 2.

FIGS. 1 and 2 illustrate mechanical connectors 10 and 110 of this invention which are adapted for use with a backlit instrument panel module 32 shown in FIG. 3. The connectors 10 and 110 are each configured to be capable of reliably securing and aligning an optical member relative to a corresponding mounting member for the purpose of achieving efficient optical transmission, while also facilitating assembly and promoting serviceability. In accordance with this invention, the connectors 10 and 110 share physical similarities which achieve the above advantages, while also being uniquely configured for use in different tasks within the modular concept of the module 32.

The environment and manner in which the connectors 10 and 110 are intended for use are represented in FIG. 3, in which the module 32 is schematically shown in cross-section. The module 32 includes a rear module wall 34 and a circuit board 36 on which a light pipe 28 is mounted. The light pipe 28 serves to backlight one or more buttons or keys (not shown) associated with the module 32, such as the control buttons for an automobile's heating, ventilation and air conditioning (HVAC) system. A vehicle bundle connector 24 is shown schematically in FIG. 3. The vehicle bundle connector 24 generally is secured to the end of a bundle of optical fibers which deliver light from a remote light source (not shown) to the module 32. To achieve the modular concept, the module 32 is independently equipped with a number of individual optical fibers 26 that deliver light from the rear module wall 34 to the light pipe 28. The connector 10 of this invention serves to interconnect the vehicle bundle connector 24 to the rear module wall 34 of the module 32, while the connector 110 of this invention serves to interconnect the individual fibers 26 to their respective light pipes 28 at the front of the module 32.

While FIG. 3 serves to illustrate one foreseeable working environment for the connectors 10 and 110, those skilled in the art will appreciate that numerous other applications and environments are possible. Therefore, the teachings of this invention are not to be limited in scope by the application represented in FIG. 3, but are to be applied broadly to applications in which an optical member composed of one or more optical fibers is to be secured and aligned with a mounting member for the purpose of transmitting an optical signal to a second optical member.

As represented in FIG. 1, the connector 10 of this invention is a one-piece structure formed of a suitably resilient and corrosion-resistant material. Preferred materials include polycarbonate, acrylic and ABS, though other suitable materials could foreseeably be used. Polycarbonate is particularly suited for the purposes of this invention, due to its strength, flexibility and temperature capabilities, as well as its resistance to creep and chemical attack. The connector 10 is formed to have a connector body 12 which defines a longitudinal axis of the connector 10. As shown, the body 12 has a generally cylindrical shape, though this shape is not particularly essential to the teachings of this invention. The body 12 has a first end 12a and an oppositely disposed second end 12b, each of which are located on the longitudinal axis of the connector 10.

An internal passage 20 is formed longitudinally within the body 12 as also shown. The internal passage 20 is tapered such that its cross-section at the first end 12a is sufficiently sized to receive at least one optical fiber 26, and preferably several of the fibers 26 within the module 32. The second end 12b of the body 12 has a smaller cross-section than at the first end 12a, but is equipped with a radially expandable feature in order to resiliently accommodate the fibers 26. In a preferred embodiment, the expandable feature is a number of cantilevered members 16 which are defined by longitudinal slots 18 formed in the second end 12b of the body 12.

When radially deflected to accommodate the fibers 26, the cantilevered members 16 apply a back tension that grips the fibers 26 when disposed within the internal passage 20. The cantilevered members 16 also accommodate variations in the size of the fibers 26 due to tolerances.

Advantageously, the back tension also operates as a one-way clutch. As the fibers 26 are inserted into the internal passage 20 from the first end 12a of the body 12, the cantilevered members 16 readily expand to accommodate the fibers 26. However, in the reverse direction, corresponding to the removal of the fibers 26 from the internal passage 20, the back tension generated by cantilevered members 16 is slightly increased due to friction, so as to provide a degree of resistance to the removal of the fibers 26, though not preventing their removal. Therefore, the cantilevered members 16 serve not only to reliably hold the fibers 26 in place, but also allow for slight readjustment during installation of the fibers 26.

The connector 10 is particularly configured to mate with the vehicle bundle connector 24, which is secured to a fiber bundle (not shown) routed from the vehicle to the module 32. For this purpose, a pair of resilient legs 14a and 14b extend from a midportion of the body 12, as shown in FIG. 1. The legs 14a and 14b are preferably diametrically opposed so as to promote stability during installation of the connector 10. Each of the legs 14a and 14b has a substantially longitudinal portion which extends towards the first end 12a of the body 12. As shown, each longitudinal portion of the legs 14a and 14b is secured to the body 12 with a substantially radial portion. In addition, the legs 14a and 14b are equipped with suitable features which project from the legs 14a and 14b for the purpose of engaging and securing the legs 14a and 14b to corresponding features, such as slots or ribs, formed in the vehicle bundle connector 24. As illustrated in FIG. 1, these features are in the form of barbs 22a and 22b, though numerous other features could foreseeably be used. Advantageously, the barbs 22a and 22b enable the connector 10 to be interlocked with the vehicle bundle connector 24 using a simple push-in action, which reduces the likelihood of damage to the fiber bundle during assembly.

As illustrated in FIG. 3, the connector 10 described above is particularly adapted for securing a vehicle fiber bundle to the module 32. For this purpose, the connector 10 includes a second pair of resilient legs 14c and 14d which extend from the midportion of the body 12 in order to connect the incoming vehicle fiber bundle and its connector 24 to the rear module wall 34, and thereby align the vehicle fiber bundle with the fibers 26 of the module 32. As with the first pair of legs 14a and 14b, the second pair of legs 14c and 14d are also preferably diametrically opposed, and each has a longitudinal portion which extends in a direction opposite to the first pair of legs 14a and 14b, towards the second end 12b of the body 12. As shown, each leg 14a and 14b also terminates with a barb 22c and 22d, respectively, which serve to engage and secure the legs 14c and 14d to corresponding features, such as apertures, formed in the rear module wall 34. As a result, the connector 10 is also configured to interlock with the rear module wall 34 using a simple push-in action.

As represented in FIG. 2, the connector 110 of this invention is also a one-piece structure which is preferably formed of a suitably resilient and corrosion-resistant material, such as polycarbonate, acrylic or ABS. The connector 110 is formed to have cylindrically-shaped body 112 having a first end 112a and an oppositely disposed second end 112b. A tapered internal passage 120 is formed longitudinally within the body 112, such that its cross-section at the first end 112a is sufficiently sized to receive a fiber core 30 of a single optical fiber 26 which has been sufficiently stripped of its outer sheath to expose the fiber core 30 (see FIG. 3). The cross-section at the second end 112b of the body 112 is smaller, but equipped with a radially expandable cantilevered members 116 defined by longitudinal slots 118. As before, the cantilevered members 116 are capable of applying a back tension that grips the fiber core 30 when forced into the internal passage 120, and operates as a one-way clutch in order to provide a degree of resistance to the removal of the fiber core 30.

As shown in FIG. 3, the connector 110 is particularly configured to secure and align the fiber core 30 to the light pipe 28, such as by aligning the fiber core 30 so as to be received within a bore in the light pipe 28. For this purpose, a pair of resilient legs 114a and 114b extend from a midportion of the body 112, as shown in FIG. 2. As with the connector 10 of FIG. 1, the legs 114a and 114b of the connector 110 are preferably diametrically opposed for stability. Each leg 114a and 114b includes a substantially longitudinal portion which extends towards the second end 112b of the body 112 and terminates with a barb 122a and 122b, respectively. The barbs 122a and 122b serve to engage and secure the legs 114a and 114b to a corresponding feature or features, such as apertures or a slot, formed in the circuit board 36. As a result, the connector 110 is configured to interlock with the circuit board 36 using a simple push-in action. In so doing, the end of the fiber core 30 is aligned with the light pipe 28 so as to directly and efficiently transmit light from the fiber 26 to the light pipe 28, as shown in FIG. 3. The cantilevered legs 116 grip the fiber core 30 in such a manner that the fiber 26 is reliably secured and aligned with the light pipe 28.

In view of the above, it can be seen that the connectors 10 and 110 of this invention are uniquely adapted to align and secure one or more optical fibers with another optical member of a fiber optic backlighting system. In use, the connectors 10 and 110 are readily assembled with their respective optical members by inserting the end of the optical member into the tapered internal passage 20 or 120. The gripping force generated by the cantilevered members 16 and 116 serves to enable the smaller end of the internal passages 20 and 120 to accommodate the corresponding optical member, reliably secure the optical member within the internal passage 20 or 120, and allow for adjustments in order to ensure that the optical efficiency of the optical junction is optimized.

In addition, the connectors 10 and 110 of this invention are each capable of being readily assembled to an appropriate mounting member using a push-in action which reliably secures and aligns the optical member with a corresponding optical member, such as the light pipe 28 or an optical fiber of a fiber bundle. The manner in which the one or more optical fibers are secured promotes the optical efficiency of a fiber optic backlighting system, while the manner in which the connectors 10 and 110 are used and installed is highly suitable for use in mass production. Finally, the connectors 10 and 110 can be readily disassembled from their respective mounting members to allow for repairs or replacement of the module 32, optical fibers 26 or the vehicle fiber bundle.

In addition to the functional advantages of the connectors 10 and 110 of this invention, each connector is also advantageously characterized by a relatively uncomplicated one-piece design which can be injected molded in a two piece die. As a result, the connectors 10 and 110 are relatively inexpensive to manufacture. Other advantages include cost savings to the automobile manufacturer, in that the connectors 10 and 110 facilitate the modular capability for instrument panel clusters, which is desirable from a manufacturing and installation standpoint for the purpose of minimizing assembly time and costs.

Finally, the connectors 10 and 110 permit the efficient use of fiber optic technology for backlighting an instrument panel of an automobile. As such, the benefits of fiber optic technology, including reduced heating and uniform brightness of the illuminated component, and the flexibility of remotely locating the light source for an instrument panel, are all promoted by the teachings of this invention.

While our invention has been described in terms of a preferred embodiment, it is apparent that other forms could be adopted by one skilled in the art; for example, by modifying the shapes and sizes of the connectors or by using materials other than those disclosed. Accordingly, the scope of our invention is to be limited only by the following claims.

The embodiments of the invention in which an exclusive property or privilege is claimed are defined as follows:

1. A connector for securing a first optical member to a mounting member so as to align the first optical member with a second optical member, the connector comprising:

a body having a longitudinal axis, a first end and an oppositely disposed second end located on the longitudinal axis;

an internal passage formed within the body along the longitudinal axis, the internal passage being tapered so as to have a smaller cross-section at the second end than at the first end, the internal passage at the first end being sized to receive the first optical member;

expandable members formed at the second end of the body so as to enable the internal passage at the second end to radially expand to accommodate the first optical member;

a pair of resilient members extending from the body, each of the pair of resilient members having a longitudinal portion extending towards one of the first and second ends of the body; and retention means disposed on the longitudinal portion of each of the pair of resilient members for engaging and securing the pair of resilient members to a corresponding feature formed in the mounting member.

2. A connector as recited in claim 1 wherein the expandable members disposed at the second end of the body are defined by a plurality of longitudinal slots formed in the second end of the body.

3. A connector as recited in claim 1 wherein each of the longitudinal portions of the pair of resilient members extends toward the first end of the body.

4. A connector as recited in claim 1 wherein each of the longitudinal portions of the pair of resilient members extends toward the second end of the body.

5. A connector as recited in claim 1 wherein the pair of resilient members are approximately diametrically opposed from each other.

6. A connector as recited in claim 1 further comprising a second pair of resilient members extending from the body, each of the second pair of resilient members having a longitudinal portion extending in a direction opposite to the pair of resilient members.

7. A connector as recited in claim 1 wherein each of the pair of resilient members comprises a substantially radial portion which interconnects the longitudinal portion to body.

8. A connector as recited in claim 1 wherein the first optical member comprises an optical fiber and the second optical member comprises a light pipe, the internal passage at the first end of the body being sized to receive the optical fiber.

9. A connector as recited in claim 1 wherein the first optical member comprises a first plurality of optical fibers and the second optical member comprises a second plurality of optical fibers, the internal passage at the first end of the body being sized to receive the first plurality of optical fibers.

10. A connector for securing a first plurality of optical members to a coupling member and a mounting member, so as to align the first plurality of optical members with a second plurality of optical members secured to the coupling member and so as to secure the coupling member to the mounting member, the connector comprising:

a body having a longitudinal axis, a first end and an oppositely disposed second end located on the longitudinal axis;

an internal passage formed within the body along the longitudinal axis, the internal passage being tapered so as to have a smaller cross-section at the second end than at the first end, the internal passage at the first end being sized to receive the first plurality of optical members;

expandable members formed at the second end of the body so as to enable the internal passage at the second end to radially expand to accommodate the first plurality of optical members;

a first pair of resilient members extending from the body, each of the first pair of resilient members having a longitudinal portion extending towards the first end of the body;

a second pair of resilient members extending from the body, each of the second pair of resilient members having a longitudinal portion extending towards the second end of the body;

first retention means disposed on the longitudinal portion of each of the first pair of resilient members for engaging and securing the first pair of resilient members to a corresponding feature formed in the coupling member; and second retention means disposed on the longitudinal portion of each of the second pair of resilient members for engaging and securing the second pair of resilient members to a corresponding feature formed in the mounting member.

11. A connector as recited in claim 10 wherein the expandable members disposed at the second end of the body are defined by a plurality of longitudinal slots formed in the second end of the body.

12. A connector as recited in claim 10 wherein the first pair of resilient members are approximately diametrically opposed from each other.

13. A connector as recited in claim 10 wherein the second pair of resilient members are approximately diametrically opposed from each other.

14. A connector as recited in claim 10 wherein each of the first and second pairs of resilient members comprises a substantially radial portion which interconnects the longitudinal portion to the body.

15. A connector as recited in claim 10 wherein the first plurality of optical members comprises a plurality of optical fibers, the internal passage at the first end of the body being sized to receive the plurality of optical fibers.

16. A connector for securing a first optical member to a mounting member, so as to align the first optical member with a second optical member secured to the mounting member, the connector comprising:

a body having a longitudinal axis, a first end and an oppositely disposed second end located on the longitudinal axis;

an internal passage formed within the body along the longitudinal axis, the internal passage being tapered so as to have a smaller cross-section at the second end than at the first end, the internal passage at the first end being sized to receive the first optical member;

expandable members formed at the second end of the body so as to enable the internal passage at the second end to radially expand to accommodate the first optical member;

a pair of resilient members extending from the body, each of the pair of resilient members having a longitudinal portion extending towards the second end of the body; and retention means disposed on the longitudinal portion of each of the pair of resilient members for engaging and securing the pair of resilient members to a corresponding feature formed in the mounting member.

17. A connector as recited in claim 16 wherein the expandable members disposed at the second end of the body are defined by a plurality of longitudinal slots formed in the second end of the body.

18. A connector as recited in claim 16 wherein the pair of resilient members are approximately diametrically opposed from each other.

19. A connector as recited in claim 16 wherein each of the pair of resilient members comprises a substantially radial portion which interconnects the longitudinal portion to body.

20. A connector as recited in claim 16 wherein the first optical member comprises an optical fiber and the second optical member comprises a light pipe, the internal passage at the first end of the body being sized to receive the optical fiber.

* * * * *